United States Patent [19]

Smith et al.

[11] Patent Number: 5,254,355
[45] Date of Patent: Oct. 19, 1993

[54] PROCESS FOR BEVERAGE TABLETS AND PRODUCTS THEREFROM

[75] Inventors: Staci L. Smith, Nanuet; Randall R. Jackson, Bronx; Joseph D. Albaum, Pleasantville, all of N.Y.; Robert W. Fusi, Stockton, N.J.; Sean S. Doherty, Mahopac, N.Y.

[73] Assignee: Kraft General Foods, Inc., Northfield, Ill.

[21] Appl. No.: 890,212

[22] Filed: May 29, 1992

[51] Int. Cl.$^5$ .............................................. A23P 1/00
[52] U.S. Cl. ............................. 426/285; 426/272; 426/512; 426/548; 426/591; 264/122
[58] Field of Search ............. 426/285, 591, 272, 311, 426/512, 517, 548; 264/122

[56] References Cited

U.S. PATENT DOCUMENTS

| | | | |
|---|---|---|---|
| 2,851,361 | 9/1958 | Diller | 426/591 |
| 2,889,226 | 6/1959 | Hinkley | 426/548 |
| 3,627,583 | 12/1971 | Troy | 426/285 |
| 3,639,168 | 2/1972 | Monti | 264/122 |
| 3,639,169 | 2/1972 | Broeg | 264/122 |
| 3,653,914 | 4/1972 | Schmitt | 426/302 |
| 3,660,107 | 5/1972 | Mayer | 426/593 |
| 3,667,962 | 6/1972 | Fritzberg et al. | 426/591 |
| 3,695,894 | 10/1972 | Hum | |
| 3,965,273 | 6/1976 | Stahl | 426/591 |
| 4,004,036 | 1/1977 | Schmitt | 426/285 |
| 4,009,292 | 2/1977 | Finucane | 426/285 |
| 4,031,238 | 6/1977 | Reid | 426/593 |
| 4,127,645 | 11/1978 | Witzel et al. | 424/44 |
| 4,292,017 | 9/1981 | Doepel | 425/107 |
| 4,343,819 | 8/1982 | Wood | 426/591 |
| 4,508,740 | 4/1985 | McSweeney | 426/285 |
| 4,579,742 | 4/1986 | Lavie | 426/591 |
| 5,017,122 | 5/1991 | Staniforth | 425/100 |

FOREIGN PATENT DOCUMENTS

| | | | |
|---|---|---|---|
| 760288 | 12/1970 | France | 426/591 |
| 88/00009 | 1/1988 | PCT Int'l Appl. | 426/591 |
| 82/02993 | 5/1988 | PCT Int'l Appl. | 426/591 |
| 2148117 | 5/1985 | United Kingdom | 426/591 |

*Primary Examiner*—Carolyn Paden
*Attorney, Agent, or Firm*—Thomas R. Savoie

[57] ABSTRACT

A rapidly-dissolving, sugar-free beverage tablet is made by formulating a mix containing from 20% to 70% mannitol, from 1% to 20% water-soluble $CO_2$-generator, intensive sweetener and food acid. The mix is compressed in an externally-lubricated tabletting press to produce a friable tablet which is then surface glazed to produce a structurally stable tablet.

10 Claims, No Drawings

PROCESS FOR BEVERAGE TABLETS AND PRODUCTS THEREFROM

TECHNICAL FIELD

This invention relates to readily-soluble, sugar-free beverage tablets which are both structurally stable and able to be dissolved in water within one minute with minimal stirring.

Dry beverage mixes enjoy wide commercial use because they offer convenience, economy, and good taste. These compositions are currently available in both pre-sweetened and unsweetened forms and are typically packaged as powders. Intensive sweetener-containing (e.g., aspartame, saccharine, cyclamate, acesulfame, etc.) beverage mixes are of particular interest to persons seeking to control caloric intake. Dry beverage compositions in powdered form can be packaged in sizes convenient for preparing a single serving or multiple servings of the beverage. However, powders tend to be difficult to control and it would be desirable to have a unitary form which prevents spillage of material while maintaining ease of preparation.

There have been prior attempts to prepare dry beverage compositions in the form of tablets; however, these tablets are typically either poorly soluble in cold water or lack the proper structural strength to maintain the integrity during normal conditions of production, packaging, shipping and handling. Therefore, it would be desirable to have a unitary dry beverage composition in the form of a rapidly-soluble, yet structurally-strong tablet.

BACKGROUND ART

The prior art has provided a number of procedures for preparing dry beverage tablets. In U.S. Pat. No. 2,889,226 to Hinkley and U.S. Pat. No. 3,660,107 to Mayer, effervescent couples are added to tabletted dry beverage mixes to improve the rate of solubility of the highly compressed tablets. Hinkley employs a wetting agent in addition to the effervescent materials.

While not directly related to the preparation of beverage tables, U.S. Pat. Nos. 3,653,914 and 4,004,036 to Schmitt describe the preparation of rapidly-soluble sweetener tablets for use in hot or aqueous media. In preparing the tablets, a minor amount of water is added with an organic solvent to release a portion of the $CO_2$ from an effervescent couple which is employed to aid in dissolving the tablet. The release of $CO_2$ during molding is said to achieve a porous structure. U.S. Pat. No. 4,004,036 indicates that the tablet is weaker than would be desired but can be strengthened by contacting the formed tablet with an organic solvent.

In U.S. Pat. No. 2,851,361 to Diller, there is disclosed a tablet for preparing a carbonated soft drink in cold water. It is indicated that the density of the tablet is a critical factor and should be about 1.3 grams per cubic centimeter. The patent discloses that because it is difficult to secure the desired high density, the tablet can be compressed while removing entrapped air. The patent further suggests that a lubricated die using a pressure of about 4,000 pounds per square inch, psig (281.2 kilograms per square centimeter, $Kg/Cm^2$) is appropriate.

U.S. Pat. No. 3,667,962 to Fritzberg et al., indicates that the solubility of tablets for preparing carbonated beverages can be improved by forming separate acid and carbonate portions which are both highly porous and friable. In the paragraph bridging columns 3 and 4 of this patent, it is indicated that these puffed materials can be crushed to powdered form. Thus, while Fritzberg et al. disclose a way to improve solubility, they do so without concern for structural strength of the formed product.

In U.S. Pat. No. 4,031,238 to Reid et al., there is disclosed a water-soluble, solid beverage cube consisting of powdered glucose monohydrate, sucrose and a hygroscopic flavor material. According to the disclosure, this mixture is heated in a closed or moistened environment and then shaped to final form. This is said to be an improvement upon the disclosed prior art procedure of combining a flavor material with a vehicle such as ethyl alcohol and water to form a damp, non-cohesive powder which is then formed into a cube under pressure and dried to evaporate the vehicle.

In U.S. Pat. No. 4,508,740 to McSweeney, an aspartame-sweetened beverage tablet is formulated with a moistener consisting of water, propylene glycol or ethyl alcohol, monocalcium phosphate and glycerine or a glycerine derivative.

Hence, there remains a present need for a sugar-free sweetened, unitary dry beverage composition in the form of a soluble, yet structurally-strong tablet, and a process for preparing such a product.

SUMMARY OF THE INVENTION

A rapidly-dissolving, sugar-free beverage tablet is prepared by compressing a dry mix into a tablet having a relatively low hardness of less than 35 Newtons, preferably less than about 25 Newtons, typically 15–25 Newtons, and then surface glazing the tablets to increase the hardness by at least 10 Newtons and into a range of 30 to 70 Newtons, typically 30–50. As will be appreciated by those skilled in the art of tablet making the hardness of a tablet is determined by use of standard equipment which measures the force (here measured in Newtons) applied in a horizontal direction against the edge of the tablet necessary to fracture the tablet. The Pharmatest TM tablet hardness tester Model PTB 311 distributed by Scientific Instruments & Technology Corp. (Piscataway, N.J.) is one such suitable piece of equipment.

The tablets are externally lubricated, as opposed to containing an internal lubricant within the mix, so that the resulting beverage is free of the waxy film which would result from the presence of an internal lubricant such as magnesium stearate. The mix will contain from 10% to 60% by weight, preferably 15% to 50%, of acidulant which should be properly sized and from 20%–70% of mannitol to function as a binder for the tablet.

Mannitol has unexpectedly been found to be unique as a binder for the tablets of this invention. Binders which are normally used in tabletting mixes, such as maltodextrins and starches, and other sugar alcohols, such as sorbitol and xylitol have not proven to be satisfactory for providing tablets having both structural stability and a hardness of 30 to 70 Newtons. Sugars would, of course, not be suitable for use as a binding agent in a sugar-free tablet.

The crystalline food acid, typically citric acid, which usually constitutes a major ingredient in a sugar-free beverage mix, should have a particle size wherein essentially all of the crystalline particles pass through a 20 mesh screen (U.S. Standard Sieve) and at least 75% of the crystalline particles are larger than 200 mesh.

A relatively small amount of a $CO_2$-source is included in the mix being tabletted in order to aid in the disintegration of the tablet when combined with water. Low levels are dictated by reason of taste as the materials which are used as a source of $CO_2$, typically carbonate or bicarbonate salts, have an undesirable taste. Since high levels of these salts need to be avoided to produce a high quality beverage, the tablets of this invention must be relatively soft in order to totally dissolve within 45 seconds with minimal stirring. The level of $CO_2$ generator used in the mix will be below the level which will provide perceptible carbonation to the beverage. Typically, a use level of less than 20%, preferably less than 10%, will be employed.

The $CO_2$-source useful in this invention are the edible, water-soluble carbonate materials capable of reacting with an acidulating agent to effect the release of carbon dioxide upon contact with water. In particular are the inorganic carbonates including sodium carbonate, sodium bicarbonate, sodium sesquicarbonate, potassium carbonate, potassium bicarbonate, calcium carbonate, ammonium carbonates, double salts (e.g., dolmite, Engel salts, etc.); these may be used alone or in combination. In order to minimize adverse flavor impact it may be preferred to use two or more carbonates, each having a different cation. A preferred source of $CO_2$ is potassium bicarbonate. A preferred particle size for the $CO_2$ source is at least 95% through 45 mesh and at least 50% through 100 mesh.

The sweetening agent may be any of the acceptable intensive sweeteners known to the art. Other functional ingredients, such as clouding agents, flow agents, buffering agents, flavors, colors, nutrients (e.g., vitamin C), may be included in the mix.

DESCRIPTION OF THE PREFERRED EMBODIMENTS

A tablettable mix, free of magnesium stearate or other lubricant powders, is fed to a tablet press where the mix is formed into tablets. An external lubricant powder, such as magnesium stearate, is applied to the contacting surfaces of the tablet dies prior to feeding the tablet mix to the dies. The lubricant can be applied according to the technique and apparatus disclosed in U.S. Pat. No. 5,017,122 to Staniforth which is hereby incorporated by reference.

An alternative method for providing external lubrication of the die surfaces involves the use of a dual stage tablet press which allows a separate and discrete, lubricant-containing placebo tablet (e.g., consisting of 97% dicalcium phosphate and 3% magnesium stearate) to be compacted at one stage, thereby applying a thin film of lubricant to the punches and dies of the press, and the tablet mix of this invention to be compacted in a next, subsequent stage. Cross-contamination between the placebo tablet and the Product tablet is avoided in this process. U.S. Pat. No. 4,292,017 to Doepel discloses another procedure for direct die lubrication which may be used in this invention.

The tablets are formed using relatively low die pressures of about 1500 to 7000 p.s.i.g. resulting in tablets which have a hardness of less than 35 Newtons and which are therefore quite friable. These tablets are collected on a non-abrasive surface, such as a screen, and are conveyed to a glazing station where the tablets are surface-hardened to provide a thin, hardened shell which will withstand subsequent handling and packaging.

Tablets may be surface glazed by exposing the tablets to an alcohol vapor atmosphere. Typically, this exposure will be for about 0.35 to 2 minutes. The vapor may be created by boiling alcohol (e.g., ethanol, ispropyl alcohol, etc.) externally and drawing the alcohol vapor through the glazing chamber and into an alcohol recovery system. Thereafter, the tablets may be exposed to heated air, typically 40° to 80° C., for a short period of time, typically about 10 to 20 minutes, in order to remove residual alcohol.

Alcohol glazing permits surface hardening without significantly increasing the dissolution time of the tablet. The hardening effect is believed to be caused by the partial solubilization of tablet ingredients, such as the food acid (e.g., citric acid) by the alcohol vapor. The thickness of the hardened coating can be controlled by the concentration of alcohol in the chamber and the residence time of the tablets within the chamber.

Due to the presence of a water-soluble $CO_2$-generator in the tablet mix, water and/or steam would be difficult to use to effect surface glazing. Infrared heating would however be another technique for providing a glazed surface to the fragile tablets produced in accordance with this invention. Suitable infrared heating equipment is described in U.S. Pat. No. 3,695,894 to Hum which is hereby incorporated by reference.

Use of a mannitol binder at a level of from 20% to 70% by weight of the tablettable mix is unique. The mannitol should be in powdered form preferably with not more than 10% by weight, most preferably about 6% by weight, being retained on a 100 mesh screen (U.S. Standard Sieve). Carbohydrate materials, such as sugars and hydrolyzed starch solids which are well known and often used binders in producing tablets, are not in this invention. Mannitol, a sugar alcohol, is not included in the term carbohydrate as used in this invention as its molecular formula does not contain twice as many hydrogen atoms as oxygen atoms. Minor amounts of carbohydrate materials, such as when used as fixatives for flavors included in the tablettable mixes of this invention, are not excluded by terminology that the mix is essentially free of carbohydrates.

Crystalline food acid is used in this invention to provide optimum particle size distribution and avoid the hygroscopic nature of amorphous materials. A preferred acid material would have at least 80% by weight of material between 40 and 200 mesh, preferably with less than 15% of material through 200 mesh and most preferably with at least 50% of material through 100 mesh.

This invention is further described with reference to the following example.

EXAMPLE 1

A lemon, fruit-flavored beverage tablet was formed with a formulation as follows:

| Ingredient | Weight % |
| --- | --- |
| Crystalline Citric Acid (100% minus 20 mesh, 97% minimum minus 60 mesh, 50% minimum minus 100 mesh and 13% maximum minus 200 mesh) | 49.3 |
| Mannitol (less than 5% on 100 mesh | 35.0 |
| Fixed Flavors | 8.1 |
| Aspartame | 3.1 |
| Cloud | 0.4 |
| Potassium Bicarbonate | 3.7 |

| Ingredient | Weight % |
|---|---|
| Color/Vitamins/Buffers | 0.4 |

All ingredients were sifted through a 30 mesh screen and thereafter mixed in a ribbon blender for about 7 minutes. The mix was fed to a dual punch tablet press (Stokes ™ Model DD2) and compressed at 4,000 p.s.i.g. The press was modified to provide external lubrication by first producing a placebo tablet of 97% dicalcium phosphate/3% magnesium stearate at the first punch station after which the actual tablet material was filled into the punch at a second filling station. The tablets ejected from the punch had a hardness ranging from 8.2 to 19.4 Newtons, with an average reading of 12.7 Newtons. The tablets dissolved in water in under 30 seconds. The ejected tablets slid down a chute and were collected in a single layer on a non-woven wire mesh tray. The tray was then exposed to a light stream of compressed air to remove any particles around or on the tablets.

The trays were then exposed to an atmosphere of alcohol vapor for about 30 seconds. This atmosphere was maintained at 81% saturation by controlling the dry bulb temperature at 39° C. and the wet bulb (using an alcohol reservoir) temperature at 35° C. After alcohol glazing, the trays were placed in a 60° C. drying oven for 15 minutes where the alcohol evaporated. After cooling the tablets were found to have a hardness ranging from 29 to 58 Newtons (average 37 Newtons) and a dissolution rate (in a glass of water with gentle stirring) averaging about 28 seconds.

The tablets of this invention are preferably packaged in rigid packaging such as a plastic tube in order to preserve structural integrity during distribution and use. The tablets were wrapped in stacks of ten, such as in with metal foil, prior to packaging in order to protect against moisture and surface abrasion.

EXAMPLE 2

An iced tea beverage tablet was formed with a formulation as follows:

| Ingredient | Weight % |
|---|---|
| Mannitol (per Example 1) | 62.7 |
| Crystalline Citric Acid (per Example 1) | 8.6 |
| Crystalline Granular Citric Acid (100% minus 30 mesh, 10% maximum on 40 mesh and 10% maximums through 100 mesh) | 6.9 |
| Soluble Tea Solids | 11.5 |
| Potassium Bicarbonate | 3.9 |
| Aspartame | 3.3 |
| Flavors | 2.4 |
| Color/Vitamins/Cloud | 0.7 |

Tablets were prepared following the procedure of Example 1. The unglazed tea tablets had a hardness ranging from 27 to 34 Newtons and a dissolution time ranging from 28 to 34 seconds. The glazed tea tablets had a hardness ranging from 39 to 67.5 and a dissolution tie ranging from 33 to 37 seconds.

Having thus described the invention, what is claimed is:

1. A method for producing a sugar-free beverage tablet which will completely dissolve in water with gentle stirring to produce a beverage within 45 seconds comprising the steps of:
   (a) dry-blending a mix containing, on a weight basis, mannitol at a level of from 20% to 70% and effective to function as the sole binder for the tablet, from 10% to 60% crystalline acid, from 1% to 20% water-soluble $CO_2$-generator and form 1% to 5% intensive sweetener, said mix being essentially free of powdered die lubricant;
   (b) compressing said mix in an externally lubricated tabletting press to obtain tablets having a hardness of less than 35 Newtons;
   (c) glazing the surface of said tablets to increase the hardness by at least 10 Newtons and into a range of about 30 to 70 Newtons.

2. The method of claim 1 wherein the mix is essentially free of hydrolyzed starch materials.

3. The method of claim 1 wherein the mix is essentially free of carbohydrate materials.

4. The method of claim 1 wherein the tablet is surfaced hardened by means of alcohol vapor.

5. The method of claim 1 wherein the acid is citric acid.

6. The method of claim 1 wherein the mannitol has a particle size distribution wherein not more than 10% by weight is retained on a 100 U.S. mesh screen.

7. The method of claim 6 wherein the acid has a particle size distribution wherein at least 80% by weight is between 40 and 200 U.S. mesh.

8. The method of claim 1 wherein the mix is screened through a 30 mesh U.S. Standard Sieve prior to tabletting.

9. The method of claim 1 wherein the hardness of the compressed mix is less than 25 Newtons.

10. The method of claim 1 wherein the mannitol is in powdered form.

* * * * *